Nov. 20, 1945.   J. L. REYNOLDS   2,389,579
INSULATED MILITARY TANK AND OTHER VEHICLE
Filed April 14, 1943   2 Sheets-Sheet 1

INVENTOR.
Julian Louis Reynolds
BY
W. Lee Helm
ATTORNEY.

Nov. 20, 1945.  J. L. REYNOLDS  2,389,579
INSULATED MILITARY TANK AND OTHER VEHICLE
Filed April 14, 1943  2 Sheets-Sheet 2

INVENTOR.
Julian Louis Reynolds
BY
ATTORNEY.

Patented Nov. 20, 1945

2,389,579

UNITED STATES PATENT OFFICE 2,389,579

INSULATED MILITARY TANK AND OTHER VEHICLES

Julian Louis Reynolds, Richmond, Va., assignor to Reynolds Metals Company, Richmond, Va., a corporation of Delaware Application April 14, 1943, Serial No. 482,993

2 Claims. (Cl. 180—1)

This invention relates to military armored vehicles and more particularly to motor driven military tanks and similar vehicles having armored surfaces. In the operation of such vehicles, serious problems due to thermic conditions have developed, these problems arising from the passage of heat rays from the engine to vital compartments of the vehicle, and, particularly, the horizontal and vertical compartments adjacent the engine and containing the gasoline tanks, also the conduction of heat rays to the fighting compartment from the hot oil in the transmission case, which often reaches a temperature of 480° F., also the conduction of heat rays into the fighting compartment from the sun, because the rays of the sun strike the external armored surfaces of the vehicle and said rays are absorbed and converted into heat units. Heat generated from the latter rays also is carried by conduction to the gasoline compartments.

It is the object of my invention to so control the passage of heat rays from point to point in a military vehicle of the character described so as to prevent heating and evaporation of gasoline in the gasoline tanks by either rays emitted from the engine or rays of the sun striking against the exterior of the metallic vehicle surfaces, or both, and also to so control passage of heat rays into the fighting compartment of the vehicle from any of the stated sources as to maintain tolerable heat conditions in such fighting compartment at all times and particularly under the intense sun and heat of desert warfare where heretofore the heat conditions in tanks during day operations under intense sun have been intolerable often preventing the maneuvering of such vehicles at certain hours of the day.

The invention will be described with reference to the accompanying drawings, in which—

Figure 3 is a vertical section on the line 3—3, Figure 1.

Figure 4 is a fragmentary vertical section through the gear casing shown in Figure 2.

Figure 4A is an enlarged sectional view through a cellular insulating structure suitable for use with the invention.

Figure 5 is an enlarged sectional view of a modified and more complex insulating structure.

Figure 1:
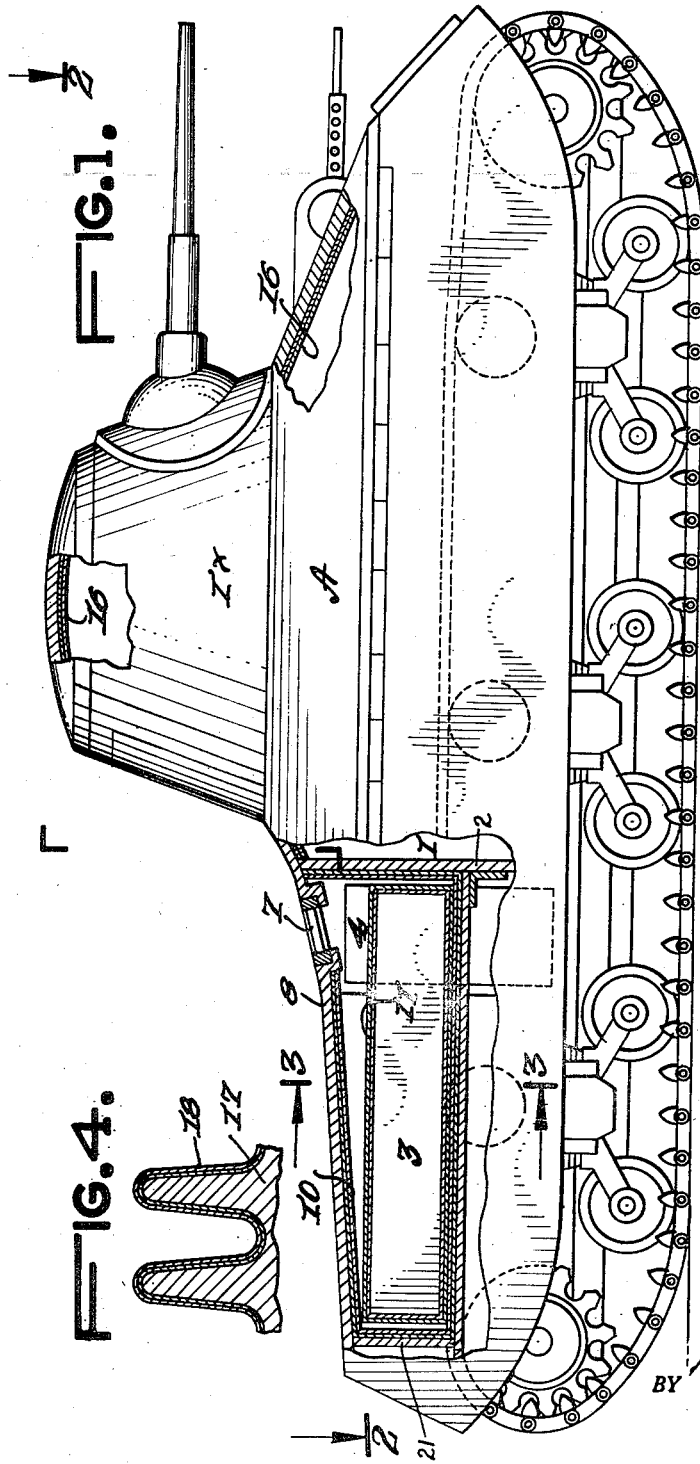
Figure 1 is a view in elevation, largely diagrammatic, and partly in section showing an armored vehicle, namely a military tank, embodying the invention.
Figure 2:
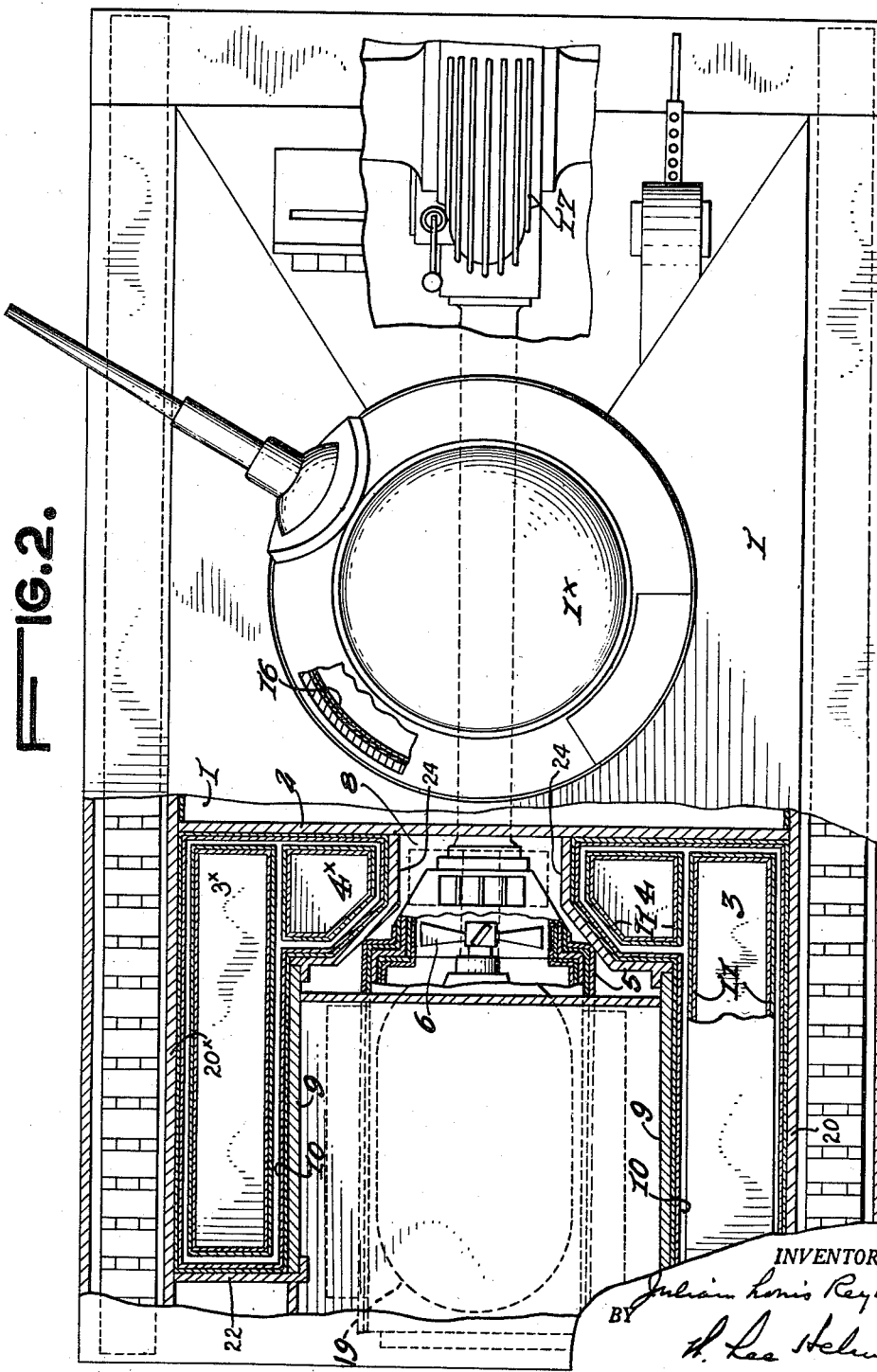
Figure 2 is a plan view partly broken away on the line 2—2, Figure 1.

Referring to the drawings, I have shown therein an embodiment of the invention in the form of a military tank A of the tractor or caterpillar type having an assembly of movable treads for locomotion. Within the tank is a fighting compartment 1 separated by a bulkhead 2 from the engine, and armored compartments or sponsons which contain the gasoline tanks. Horizontally placed gasoline tanks 3, 3$x$ and vertically placed gasoline tanks 4, 4$x$ are contained in these sponsons. The compartment or sponson for the horizontal tank 3 is formed by fire wall 9, a wall 20 parallel therewith, the bulkhead 2 and a front wall 21 (Figure 1). The compartment or sponson for the horizontal tank 3$x$ is formed by the second fire wall 9, bulkhead 2, front wall 22 and outer wall 20$x$. The sponson or compartment for vertical tank 4 is formed by bulkhead 2 and an angular wall 24 which connects the bulkhead with one fire wall 9, and a like angular wall 24 connects the bulkhead 2 with the second fire wall 9 to form the sponson or compartment for vertical tank 4$x$. Surrounding the engine, and particularly, air-cooled types of engines, there is placed a shroud 5. This shroud is so placed that the air circulating fan 6, which usually is driven from the clutch assembly of the engine, sucks air through a grill work in the deck plate 8 and forces this air over the heated parts of the engine. The engine is indicated diagrammatically at 19, and the fan at 6.

At each side of the shroud 5, is a sponson shield plate or fire wall 9, which in each case forms an inner protecting wall of a sponson compartment. The temperature of the air meeting the heated members of the engine reaches 190° F.–250° F., and this heat is transmitted through the armored members including the sponson shield plates 9 into the gasoline compartments, and particularly the horizontal compartments, causing the gasoline to evaporate or boil away. This heat effect is augmented by the rays of the sun striking upon the exterior surfaces of the tank, the heat thus generated being conducted through the armor plate to the gasoline compartments.

In the operation of my invention, I attach metallic foil or very thin sheeting, preferably made of aluminum having a polished surface, to the interior surfaces of the gasoline compartments, and also I may apply such foil or sheeting to surfaces, preferably the exterior surfaces, of the gasoline tanks themselves. The foil or sheeting attached to the interior surfaces of the gasoline compartments is diagrammatically indicated at 10, and that exterior the gasoline tanks is diagrammatically indicated at 11. Also I may apply such foil in sheeting to the interior or exterior surfaces, or both, of the shroud 5.

The method of procedure of covering these said surfaces may be several, one of which is to apply pure metallic foil or foil laminated structures, preferably aluminum foil, and preferably with the mat or unpolished side to the surface to be covered, employing a glue or adhesive. While not restricting myself to any particular adhesive, actual battle and service conditions are best satisfied by using a particular type of glue; namely, one that will stand the solvent action of gasoline, as well as the physical and chemical action of steam, hot water, and oil. These requirements are best fulfilled by using such cold-setting glues as shellac, lacquer and/or lacquer-resin compositions. Of special interest are the fire-resisting vinylytes. The adhesive in solution form is applied to the surface to be covered with foil or foil laminations with a brush or spraying apparatus. The glue so applied is allowed to rest a sufficient time for the volatile content thereof to leave said glue until said glue has become tacky, the degree of tackiness depending upon the absorbing or non-absorbing qualities of the foil or foil lamination to be adhered thereto.

As an example, if pure foil per se is to be applied to the armored vehicle members, nearly all of the volatile content of the glue must be allowed to escape and a greater degree of dry tackiness be achieved before the metal foil is adhered to the surface, because once adhered there is no way for the volatile content of the adhesive to escape. A wet glue surface would not form a good bond for metal to metal attachment, and the metal could be easily scraped off or removed by the slightest exterior friction or scuffing. However, if an absorbent material such as asbestos or glass cloth or fireproof paper is laminated to the mat or dull side of the foil, and the foil with the sheet material side innermost is applied to the glued vehicle surfaces, glue may not need be so dry, as any wetness in the glue will be absorbed by the absorbent qualities of the sheet material laminated to the foil.

While I have found that the several physical qualities and phenomena performed by the foil so attached, whether foil per se is attached to the motor vehicle, or laminated foil, actual application and working conditions are improved if an absorbent sheet metal is applied to the dull or mat side of this metal foil. While the purview of my invention encompasses the use of any sheet material, such as paper, cloth, or combination thereof, actual requirements are best fulfilled with the use of asbestos sheeting applied to the foil and acting as a buffer member between the foil and the surface to be covered; however, my invention is not to be restricted to the use of a buffer member in sheet form, but may well and easily be applied with the aid of an adhesive directly to the foil in fibre form. In the process of lamination of this buffer member to the foil, I preferably size both sides of the asbestos sheet to prevent undue absorption of the laminating and adhering adhesives later. This sizing may either be shellac, lacquer, or lacquer-resin compositions. The sheeting, and preferably asbestos sheeting, so sized on both sides is then laminated to the foil with a suitable adhesive, which, as hereinbefore mentioned, may be of the lacquer type. It will be understood that this invention is not restricted to the use of any particular adhesive, or type of adhesive, nor to any weight, caliper, composition or type of sheeting so applied to the foil, nor need the sheeting be carried by the foil, as in many instances the desired result may be achieved by applying a sheeting, or blowing fibre, onto the tank members to be covered.

It will be seen that the interior walls of the fighting compartment 1 and the turret 1x are interiorly covered with my radiant reflecting surfaces as indicated at 16. Also the outer surfaces of the transmission casing 17 are covered in like manner as indicated at 18, Figure 4.

There are some times conditions when it is not desirable to place foil on the gasoline tank, these conditions arising, for example, in desert warfare when hot gasoline is placed in the tanks, and foil on the surfaces of said tanks would retard cooling of the gasoline. In such case the employment of my radiant reflecting surfaces on the fuel tank compartments will be continued.

When the rays of the sun strike the external members of the ordnance vehicle, said rays are absorbed and converted into heat units. The heat units so formed pass through the metal armor plate and into the foil or foil lamination. In event that the foil lamination is used, the lamination forms a certain retarding action. However, whatever the material used to cover the interior of the vehicle is, whether foil or foil lamination, the surface of the foil or foil lamination reveals the presence of heat when direct contact is made thereto or therewith, but the inherent and physical properties of the exposed polished surfaces of the metal foil, and especially the polished surfaces of aluminum foil, do not allow or permit the heat units to leave those polished surfaces. This is according to the laws of emissivity of surfaces of materials. The heat made from the solar radiation, therefore, is not allowed to reach the gasoline in the gasoline tanks.

If, however, through ventilating air or other sources of heat, the exterior surfaces of gasoline tanks are subjected to the bombardment of molecules caused by heat or heated material, the polished foil material which has been applied to the exterior of the gasoline tanks will reflect and throw off said heat or bombarding molecules as contained in dust agglomerates or ether waves. It has been found that circulation of air or other fluid gaseous media greatly enhances and increases the efficacy of foil insulation, and especially aluminum foil insulation. The same basic phenomenom occurs with the heat thrown off by the engine, only in this instance the foil on the engine side of the sponson shield plate acts as an additional insulation and reflecting surface. It has also been found that when heavy asbestos sheeting 13, covered with foil 12 on one or both sides, or two pieces of foil covered sheeting, separated by a corrugated member 14 on a backing sheet 15, as heretofore mentioned, interposed between the gasoline tank and the interior surfaces of the gasoline tank compartments, much lower interior temperatures are reached. Such construction is valuable when and if mud or dirt are allowed to accumulate and fill up the air space between the gasoline tanks and the gasoline tank compartments, because mud, dirt or grime, when adhered to metal foil insulated surfaces, greatly reduces the insulating properties of said foil, and in event of using a laminated corrugated foil member, the mere cutting of the corrugated member with a dull instrument seals up the ends or open spaces and allows reflecting surfaces in a sealed condition.

The same physical processes occur when the fighting compartments are interiorly covered with foil or foil sheet laminations or foil fibre laminations. The interior insulation with the use of metal, and especially aluminum foil, in the fighting and gunnery compartments greatly increases the efficiency of any air conditioning unit placed in said compartments, as the foil insulation so applied prevents the absorption, conduction and radiation of heat energy transmitted to the tank by solar or other exterior causes.

Having described my invention, what I claim and desire to secure by Letters Patent, is as follows:

1. An armored motor vehicle having a fighting compartment and a combined engine and gasoline tank compartment, the said compartments being separated by a metal bulkhead presenting metallic surface areas, a metal shroud encircling the engine, two sets of walls likewise presenting metallic surface areas, each set of walls complementing the shroud and the bulkhead to define a gasoline tank compartment adjacent the engine compartment, armored plates including a deck plate covering the said fighting compartment and said engine and gasoline tank compartments, sheets of foil, each having a surface adapted for adherence to a metallic facing and also having highly radiant reflecting surfaces, said sheets of foil being secured to the engine shroud and to the remaining walls which define the gasoline tank compartments, others of said foil sheets being secured to the said armored plates, said foil sheets insulating the fighting, engine and gasoline tank compartments, also insulating the fighting compartment from heat rays from the engine compartment, part of said foil sheets insulating the gasoline tank compartments from the heat rays of the engine.

2. The armored motor vehicle as described in accordance with claim 1 further provided with gasoline tanks receivable in the said gasoline tank compartment and presenting exterior metallic surface areas, and sheets of foil having a mat surface and a highly radiant reflecting surface secured to the sides of the said gasoline tanks, the mat surface of the foil being adhered to the said exterior metallic surface areas of the gasoline tanks to insulate them from heat rays from the engine and from sun rays.

JULIAN LOUIS REYNOLDS.